(12) United States Patent
Nelson

(10) Patent No.: US 9,494,470 B2
(45) Date of Patent: Nov. 15, 2016

(54) THERMISTOR BASED MEASUREMENT SYSTEM

(71) Applicant: Varian Semiconductor Equipment Associates, Inc., Gloucester, MA (US)

(72) Inventor: Larry G. Nelson, Webster, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 296 days.

(21) Appl. No.: 14/220,435

(22) Filed: Mar. 20, 2014

(65) Prior Publication Data

US 2015/0268264 A1  Sep. 24, 2015

(51) Int. Cl.
| | | |
|---|---|---|
| *G01F 1/68* | (2006.01) | |
| *G01K 7/22* | (2006.01) | |
| *G01P 5/12* | (2006.01) | |
| *G01K 13/02* | (2006.01) | |
| *G01F 1/684* | (2006.01) | |
| *G01F 1/688* | (2006.01) | |
| *G01F 1/696* | (2006.01) | |
| *G01F 1/698* | (2006.01) | |

(52) U.S. Cl.
CPC ............ *G01K 7/22* (2013.01); *G01K 13/02* (2013.01); *G01P 5/12* (2013.01); *G01F 1/6847* (2013.01); *G01F 1/6888* (2013.01); *G01F 1/698* (2013.01); *G01F 1/6965* (2013.01); *G01K 2013/024* (2013.01); *G01K 2201/02* (2013.01)

(58) Field of Classification Search
CPC .... G01F 1/6965; G01F 1/6847; G01F 1/698; G01F 1/6888; G01K 13/02; G01K 2201/02; G01K 7/22; G01K 2013/024
USPC .............. 73/861.85, 204.11, 204.17, 204.25, 73/1.16, 202.5, 204.15, 204.23; 374/102
See application file for complete search history.

(56) References Cited

U.S. PATENT DOCUMENTS

| | | | |
|---|---|---|---|
| 4,297,881 A | 11/1981 | Sasayama et al. | |
| 4,413,514 A | 11/1983 | Bowman | |
| 5,537,871 A | 7/1996 | Itsuji et al. | |
| 5,710,380 A | 1/1998 | Talley et al. | |
| 6,628,202 B2 * | 9/2003 | McQueen ............... | G01F 1/684 340/603 |
| 7,418,878 B2 * | 9/2008 | Burton .................... | G01F 1/699 73/204.14 |
| 7,647,843 B2 * | 1/2010 | Burton ................... | G01F 1/6965 73/861.85 |
| 8,650,947 B2 * | 2/2014 | Lopez .................... | G01F 1/6842 73/204.27 |

(Continued)

OTHER PUBLICATIONS

International Search Report/Written Opinion mailed May 29, 2015 in corresponding PCT application No. PCT/US2015/019451.

*Primary Examiner* — Lisa Caputo
*Assistant Examiner* — Jonathan Dunlap

(57) ABSTRACT

A measurement system for monitoring ambient temperature and airspeed is disclosed. The measurement system uses a single temperature sensor, disposed in the environment under test, in communication with a controller. The controller supplies a first current to the temperature sensor to measure the ambient temperature of the environment. This first current is selected so that it results in little or no self-heating of the temperature sensor. After the ambient temperature is determined, a second, higher current is applied to the temperature sensor. This higher current serves to heat the temperature sensor be a predetermined amount. Based on the expected temperature rise, the ambient temperature and the actual monitored temperature, the airspeed may be determined.

20 Claims, 4 Drawing Sheets

(56) References Cited

U.S. PATENT DOCUMENTS

| | | | | |
|---|---|---|---|---|
| 8,734,007 B2* | 5/2014 | Campbell | ........... | G01F 25/0007 374/1 |
| 2002/0003832 A1* | 1/2002 | Siefert | ..................... | G01K 7/42 374/169 |
| 2002/0130780 A1* | 9/2002 | McQueen | ............... | G01F 1/684 340/603 |
| 2003/0233860 A1* | 12/2003 | Deane | ..................... | G01F 1/363 73/1.16 |
| 2004/0231412 A1 | 11/2004 | Golan | | |
| 2005/0092078 A1 | 5/2005 | Ellis et al. | | |
| 2005/0150310 A1* | 7/2005 | Beversdorf | ........... | G01F 1/6986 73/861.85 |
| 2005/0199735 A1* | 9/2005 | Eisenhour | .......... | B60H 1/00735 236/1 C |
| 2006/0090573 A1* | 5/2006 | Foss | ........................ | G01F 1/684 73/861.85 |
| 2008/0066541 A1* | 3/2008 | Burton | .................. | G01F 1/6965 73/204.15 |
| 2008/0271545 A1* | 11/2008 | Burton | .................. | G01F 1/6965 73/861.85 |
| 2010/0037688 A1* | 2/2010 | Inoue | .................... | G01F 1/6888 73/204.11 |
| 2012/0011940 A1* | 1/2012 | Huang | .................. | G01F 1/6845 73/861.08 |
| 2013/0107905 A1* | 5/2013 | Campbell | ........... | G01F 25/0007 374/1 |
| 2014/0064320 A1* | 3/2014 | Campbell | ........... | G01F 25/0007 374/1 |
| 2014/0116128 A1* | 5/2014 | Mantinband | .......... | G01F 1/6847 73/204.11 |

* cited by examiner

THERMISTOR BASED MEASUREMENT SYSTEM

FIELD

This disclosure relates to a system for determining ambient temperature and airspeed using a single thermistor.

BACKGROUND

In many industrial applications, it is beneficial to monitor ambient conditions. These ambient conditions may include temperature and air flow. For example, certain components, such as power supplies, central processing units, and others, are known to generate a significant amount of heat during normal operation. Cooling mechanisms, such as heat sinks and fans, are used to move this generated heat away from the component, thereby allowing it to operate within its specified operating temperature range.

Often times, component life is negatively impacted by insufficient cooling, which results in elevated temperatures. This may be due to a blockage in the air flow path, an inoperative fan, or other causes. Insufficient cooling may result in premature failures and reduced reliability. Sensors are therefore used to monitor temperature and air flow to insure that these components are being operated in their specified ranges. Often, two of more discrete sensors are needed: a temperature sensor to measure the ambient temperature of the component, and an airflow sensor to measure the flow rate of the air passing over or near the component.

However, these measurement systems are often expensive, cumbersome, and may also be unreliable. Therefore, it would be beneficial if a simpler measurement system were available, which minimizes the number of sensors required. A method of using such a measurement system would also be advantageous.

SUMMARY

A measurement system of monitoring ambient temperature and airspeed is disclosed. The measurement system uses a single temperature sensor, disposed in the environment under test, in communication with a controller. The controller supplies a first current to the temperature sensor to measure the ambient temperature of the environment. This first current is selected so that it results in little or no self-heating of the temperature sensor. After the ambient temperature is determined, a second, higher current is applied to the temperature sensor. This higher current serves to heat the temperature sensor be a predetermined amount. Based on the expected temperature rise, the ambient temperature and the actual monitored temperature, the average airflow may be determined.

According to a first embodiment, a measurement system is disclosed. The measurement system comprises a current source to supply an input current; a thermistor to receive the input current and generate an output voltage that is a function of the input current and a temperature of the thermistor; and a controller, comprising a processing unit in communication with a memory element, comprising instructions which, when executed by the processing unit: control the current source to output a first input current to the thermistor so that the processing unit can determine an ambient temperature based on a first output voltage received from the thermistor; and control the current source to output a second input current, higher than the first current, to the thermistor so that the processing unit can determine an indication of an airspeed about the thermistor based on a second output voltage received from the thermistor.

According to a second embodiment, a measurement system is disclosed. The measurement system a current source to supply an input current; a thermistor to receive the input current and generate an output voltage that is a function of the input current and a temperature of the thermistor; and a controller, comprising a processing unit in communication with a memory element, comprising instructions which, when executed by the processing unit control the current source to output a first current to the thermistor, the first current selected so as to raise a temperature of the thermistor by no more than 0.5° C. in the absence of airflow about the thermistor, so that the processing unit can determine an ambient temperature based on a first output voltage received from the thermistor; output a representation of the ambient temperature; control the current source to output a second current, higher than the first current, to the thermistor so that the processing unit can determine airspeed based on a second output voltage received from the thermistor and the ambient temperature; and output an indication of the airspeed.

BRIEF DESCRIPTION OF THE DRAWINGS

For a better understanding of the present disclosure, reference is made to the accompanying drawings, which are incorporated herein by reference and in which.

DETAILED DESCRIPTION

As stated above, measurement systems for monitoring ambient condition often require multiple sensors. The present measurement system includes a single sensor element that is used to perform two separate functions. It is used to determine the ambient temperature of an environment, and it is also used to determine the airspeed in this environment.

Figure 1:
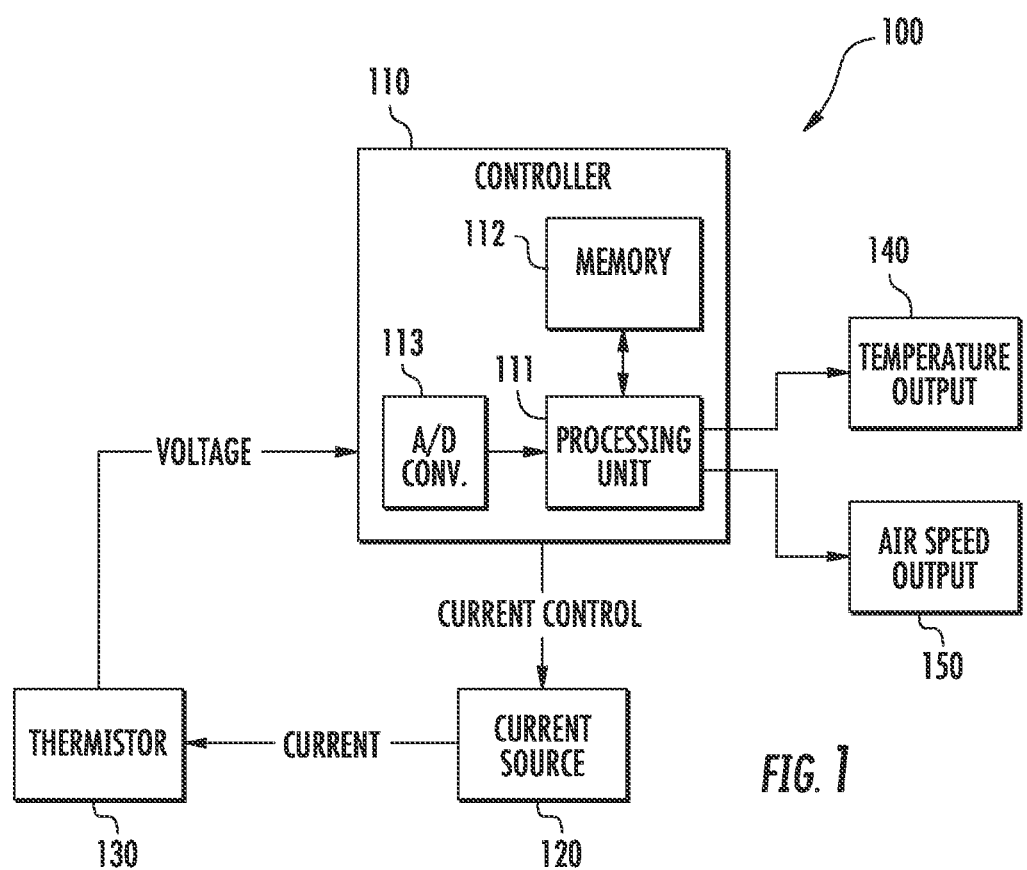
FIG. 1 is a block diagram of a measurement system in accordance with one embodiment.

FIG. 1 shows a block diagram of a measurement system 100, according to one embodiment. The measurement system 100 includes a controller 110, which includes a processing unit 111. The controller 110 executes instructions stored in a memory element 112 that is in communication with the processing unit 111. In some embodiments, the memory element 112 is embedded in the controller 110 as illustrated in FIG. 1. In other embodiments, the memory element 112 is a separate component. The memory element 112 may be a volatile device, such that its contents are lost when power is removed. Volatile memory elements include DRAM, and RAM. Alternatively, the memory element 112 may be a non-volatile memory element, such as ROM, FLASH, EEROM, and magnetic or optical devices. In some embodiments, the memory element 112 includes both types of memory; instructions may be stored in a non-volatile memory, while data, which may be changed, may be stored in a volatile memory device. The instructions may be written in any suitable language and, when executed by the processing unit 111, allow the controller 110 to execute the processes described herein.

The controller 110 may be implemented in a variety of ways. For example, the controller 110 may be a microprocessor with internal or external memory. In another embodiment, the controller 110 may be a field programmable gate array (FPGA), a programmable logic device (PLD), a PIC (programmable interface controller), or other devices. The implementation of the controller 110 is not limited by this disclosure.

The controller 110 is in communication with a current source 120. The controller 110 has the ability to control the amount of current supplied by the current source 120. In some embodiments, the current source 120 may be integrated into the controller 110. In other embodiments, the current source 120 is a separate element as illustrated in FIG. 1. For example, the controller 110 may have an internal digital-to-analog (D/A) converter, which allows it to output a variable analog voltage. This analog voltage may then be translated into a corresponding current by the current source 120. In other embodiments, the controller 110 may output a digital value (either in parallel or serial form). This digital value is received by the current source 120, which converts the digital value into a corresponding current. In another embodiment, the controller 110 may have a digital output, referred to as current select bits, which may be one or more bits. The current select bits are used by the current source 120 to select one of several predetermined currents. For example, a single digital output can be used to select between two predetermined currents, while N outputs can be used to select between up to $2^N$ different currents.

The output of the current source 120 is then provided to a sensor, such as thermistor 130. A thermistor is any device that has a deterministic relationship between its temperature and its internal resistance. Thus, when current is passed through the thermistor 130, a voltage is generated across its internal resistance. This voltage is a function of the supplied current and the temperature of the thermistor. Since the amount of current supplied to the thermistor is known, the ambient temperature about the thermistor can be readily determined. In other words, the supplied current to the thermistor results in a voltage drop across the thermistor. Since the supplied current is known and the voltage drop is known, the internal resistance of the thermistor can be determined. Once the internal resistance is determined, the ambient temperature can be determined from the known characteristics of the thermistor 130.

The voltage output from the thermistor 130 is supplied to the controller 110. In some embodiments, such as that illustrated in FIG. 1, the controller 110 includes an analog-to-digital (A/D) converter 113 to convert the analog voltage back into a digital value. In other embodiments, the A/D converter is an external component, separate from the controller 110. The controller 110 may also provide two different outputs, a temperature output 140, and an airspeed output 150. The airspeed output 150 may be a measure of the flow rate of air passing over or near the thermistor 130. Alternatively, the airspeed output 150 may be an indication of the flow rate of air passing over or near the thermistor 130. These outputs may be continuously output, such as via dedicated output ports. For example, these outputs may be used to drive a display, such as an LED or LCD display, which reports these values to the user. These outputs may be parallel digital data, serial digital data or analog data, depending on the configuration of the system. For example, in one embodiment, the controller 110 may output an analog voltage which is representative of the ambient temperature. In another embodiment, these outputs may be provided in response to a request from an external circuit. For example, an external circuit may be responsible for monitoring overall system operation, of which ambient temperature and airspeed is but a single element. A communications protocol may be utilized for the external circuit to request the outputs from the controller 110.

In one embodiment, the airspeed output 150 may simply be a binary value. In other words, rather than output the actual airspeed, the controller 110 provides an indication that the airspeed is acceptable or not. For example, in some configurations, the exact value of the airspeed may not be necessary; an indication of whether the airspeed is greater than a predetermined threshold may be sufficient.

The temperature output 140 and the airspeed output 150 may be in many forms. As described above, in some embodiments, one or more pins or ports of the controller 110 may be dedicated to continuously providing this information to the external environment. For example, a multibit port may be used to provide a digital representation of one or more of these parameters. In another embodiment, an analog output, such as an analog voltage or current, may be output by the controller 110 to represent one or both parameters. In another embodiment, one or both parameters may be represented as a single bit, which serves as an indicator that the respective parameter is within a predetermined range. In yet another embodiment, the parameters are only output by the controller 110 in response to a request from an external circuit.

In one particular embodiment, the ambient temperature is output as an analog voltage, while the airspeed is output as a one bit indicator.

Figure 2:
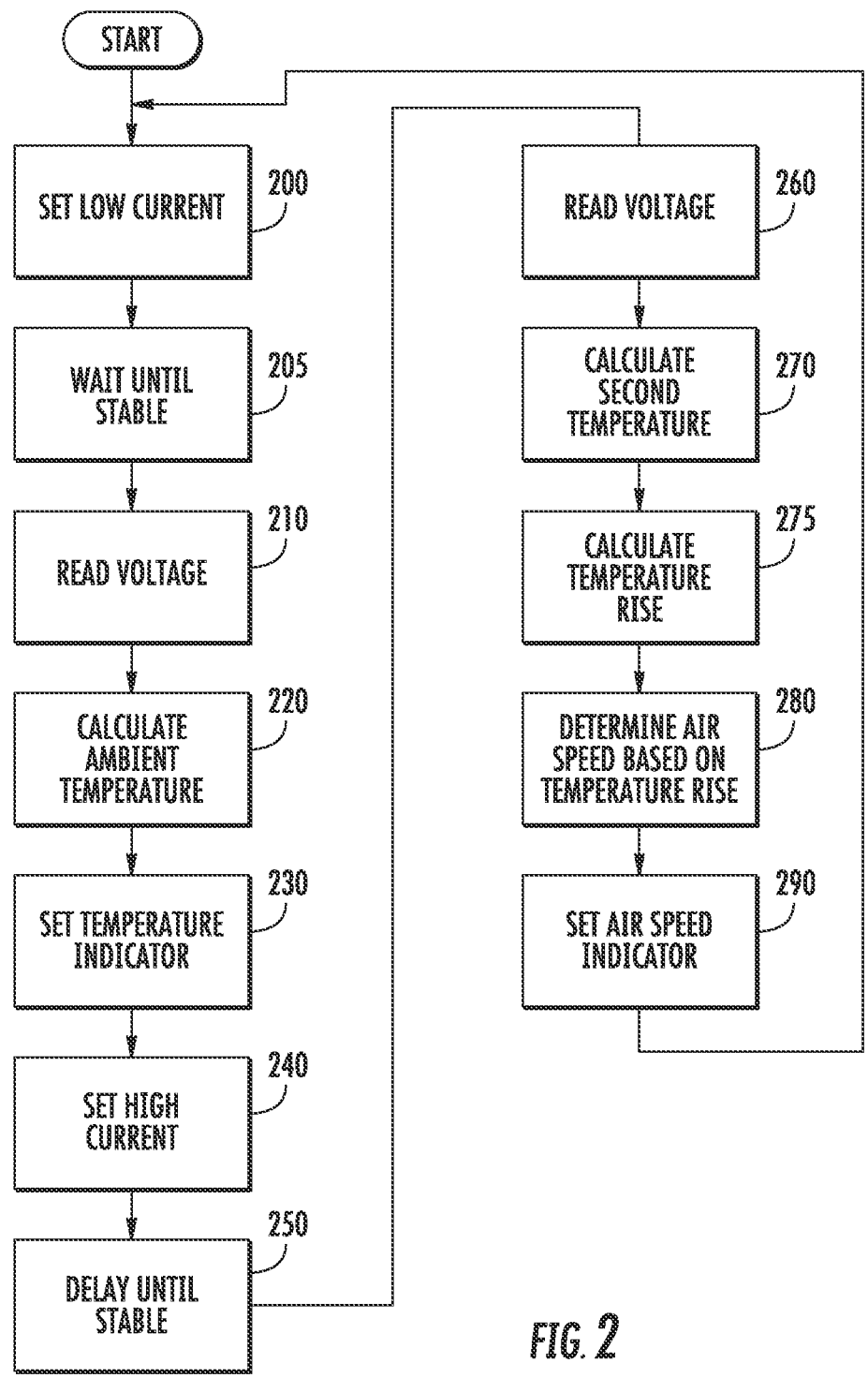
FIG. 2 is a representative flow chart showing the operation of a measurement system according to one embodiment.

Having described the components that comprise the measurement system 100, the operation of the measurement system will be provided. FIG. 2 shows a representative flowchart that may be used in conjunction with the measurement system of FIG. 1.

As described above, this method is performed by the measurement system, with the instructions in the memory element 112 allowing the processing unit 111 to execute the required sequence.

First, as shown in Box 200, the controller 110 instructs a low current to be supplied to the thermistor 130. In some embodiments, the low current is one that raises the temperature of the thermistor 130 by less than 0.5° C., in the absence of airflow about the thermistor. Of course, other values are also possible. For example, in one embodiment, the low current raises the temperature of the thermistor 130 by less than 0.1° C. in the absence of any airflow. In one particular embodiment, the low current may be about 1 mA.

This may be done by providing a voltage, indicative of that low current, from the controller 110 to the current source 120. In another embodiment, it may be done by outputting from the controller 110, a digital value, indicative of that low current, to the current source 120. In another embodiment, this may be performed by changing the value of one or more current select bits, where the state of these current select bits determines the current to be provided by the current source 120.

The current source 120 receives the output from the controller 110, and converts this to the desired current, which is then provided to the thermistor 130.

As explained above, the thermistor 130 includes an internal resistor, whose resistance is a function of temperature of the thermistor. As with all resistive elements, heat is generated when current is passed therethrough. The low current is selected such that the heat generated internal to the thermistor 130 by the internal resistor has an insignificant effect on the temperature of the thermistor 130. The controller 110 then delays to allow the output voltage to stabilize, as shown in Box 205.

The stability of the voltage can be determined in several ways. According to one embodiment, a predetermined delay is introduced between the time when the low current is applied to the thermistor 130 (Box 200), and the time that the voltage is read by the controller 110 (Box 210). Accordingly to another embodiment, the controller 110 reads the output voltage repeatedly until the same voltage is returned at least two consecutive times.

After the voltage from the thermistor 130 has stabilized, the voltage is read by the controller 110, as shown in Box 210. Based on the output current and the received voltage, the controller 110 can determine the ambient temperature, as shown in Box 220. In some embodiments, there is a known equation that the controller 110 may use to determine temperature from current and voltage. For example, the thermistor 130 may have a fixed relationship between its temperature and its internal resistance. By knowing the current and the voltage, the internal resistance of the thermistor 130 can be readily calculated. The relationship between its temperature and its internal voltage can then be used to determine the ambient temperature. In other embodiments, the controller 110 may determine the ambient temperature by indexing into a table stored in the memory element 112. This table may be a mapping of internal resistance to temperature. Other methods of converting the returned voltage into a temperature are also within the scope of the disclosure.

Once the ambient temperature has been determined, it may be presented as temperature output 140, as shown in Box 230. In some embodiments, as described above, the temperature output 140 may be output on a dedicated analog or digital port of the controller 110. In other embodiments, the controller 110 may forward this information to an external circuit, which then further processes this information. In other embodiments, this information is stored by the controller 110 until it is requested by the external circuit.

The controller 110 then sets a higher current level, as shown in Box 240. This higher current value is selected because it creates a known or predictable rise in the temperature of the thermistor 130, due to the heat generated by the internal resistor. Specifically, the current passing through the internal resistor, multiplied by the voltage across that resistor, defines the power being dissipated by the internal resistor as heat. In the absence of any airflow, the heat generated by the internal resistor will increase the temperature of the thermistor by a predictable amount. However, air, which is at a lower ambient temperature (which was previously determined in Box 220), passes over the thermistor 130, removing some of this heat from the thermistor 130. Of course, with greater airflow, more of this heat will be removed. The ultimate temperature rise is a function of the rate of airflow passing over the thermistor 130.

The higher current level may be a current which raises the temperature of the thermistor 130 through self-heating by at least 2° C., in the absence of any airflow about the thermistor 130. It may be that greater temperature rises allow better accuracy or resolution in determining actual airspeed.

In Box 250, the controller 110 delays until the voltage output from the thermistor 130 is stable. This may be done by waiting a predetermined amount of time before the controller 110 reads the output voltage. In another embodiment, this may be done by repeatedly reading the output voltage until the returned value is constant. After this delay, as shown in Box 260, the voltage is read, in the same way as was done in Box 210. This voltage and higher current combination can be used to determine a second internal resistance. This second internal resistance can be converted to a second temperature, as shown in Box 270, using the techniques described above with respect to Box 220. This second temperature is different than the ambient temperature, since the thermistor 130 is generating heat locally. In this case, the second temperature is affected by the self-heating effect of the internal resistance, and may record a higher temperature. The temperature rise, defined as the difference between the second temperature and the ambient temperature, can be calculated, as shown in Box 275.

Based on the temperature rise calculated in Box 275, the air speed can be determined, as shown in Box 280. Since the controller 110 is aware of the expected temperature rise due to the higher current level, and is also aware of the actual temperature increase, the airspeed can be calculated. In one embodiment, all of the cooling is assumed to be the result of airflow. In other words, the thermistor 130 is not in contact with, or in proximity to, any heat sinks that also draw heat away from the thermistor 130.

Figure 4:
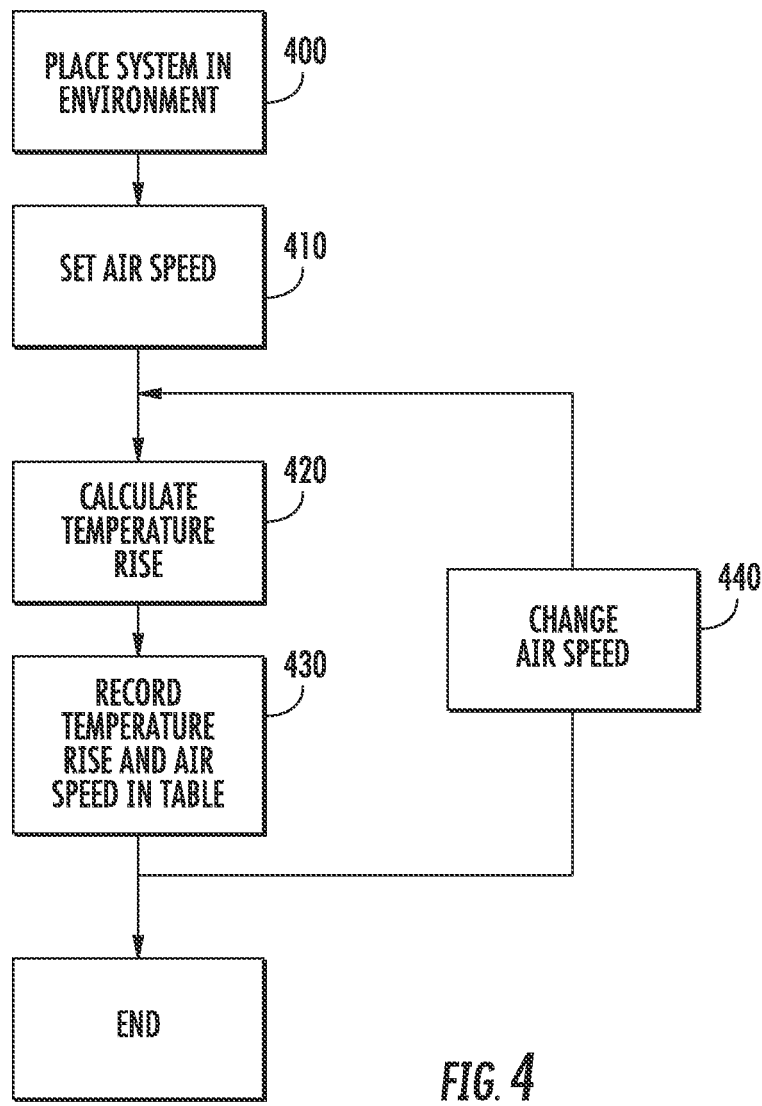
FIG. 4 is a representative flow chart showing a relationship between temperature rise and airspeed according to one embodiment.

The airspeed can be determined in several ways. In one embodiment, a table is generated showing the relationship between temperature rise and airspeed. A method of generating this table is depicted in FIG. 4. In one embodiment, the measurement system 100 is installed in its environment, as shown in Box 400. The fan is set to output a first predetermined airspeed, as shown in Box 410. The sequence shown in Boxes 200-275 of FIG. 2 are then executed to determine the temperature rise, as shown in Box 420. Since the airspeed is known, an entry can be made in a table that relates the observed temperature rise with the known airspeed, as shown in Box 430. The airspeed can then be changed to a different predetermined amount of airflow, as shown in Box 440. The procedure shown in Boxes 420-440 can be repeated as many times as desired. During each pass, a different temperature rise is calculated in Box 420. This temperature rise is then entered into the table with the corresponding known airspeed in Box 430. A larger number of different airspeeds may allow better accuracy of the measurement system 100.

The embodiment of FIG. 4 is one approach to relating temperature rise to airspeed. However, other techniques may also be used. For example, it may be determined, either empirically or theoretically, that there is a fixed relationship between temperature rise and airspeed. For example, the procedure of FIG. 4 may be used to generate a plurality of data points. An equation can then be extrapolated from these points. For example, in one embodiment, a best fit line may be generated, and the equation of this best fit line may then be used to convert any observed temperature rise into a corresponding airspeed.

In yet another embodiment, where a binary indication of airspeed is output by the controller 110, the process shown in Boxes 400-430 may be executed only once. For example, if there is a known threshold for desired airflow, that airspeed can be used in Box 410. The temperature recorded in Box 420 may then indicate the maximum allowable temperature rise.

Returning to FIG. 2, after the determination is made in Box 280, the calculated airspeed is available. For example, the airspeed may be output on a dedicated port, so that it can be displayed on a LED or LCD display, as shown in Box 290. In other embodiments, the airspeed is communicated to an external circuit that further processes this information. In another embodiment, a single bit may be used to indicate that the calculated airspeed is within acceptable limits, such as greater than a predetermined threshold.

The controller 110 then repeats this process, returning to Box 200. This process may be executed continuously. In other embodiments, the sequence shown in FIG. 2 is repeated every 10-20 seconds, to insure that unsafe temperatures are not experienced.

Figure 3:
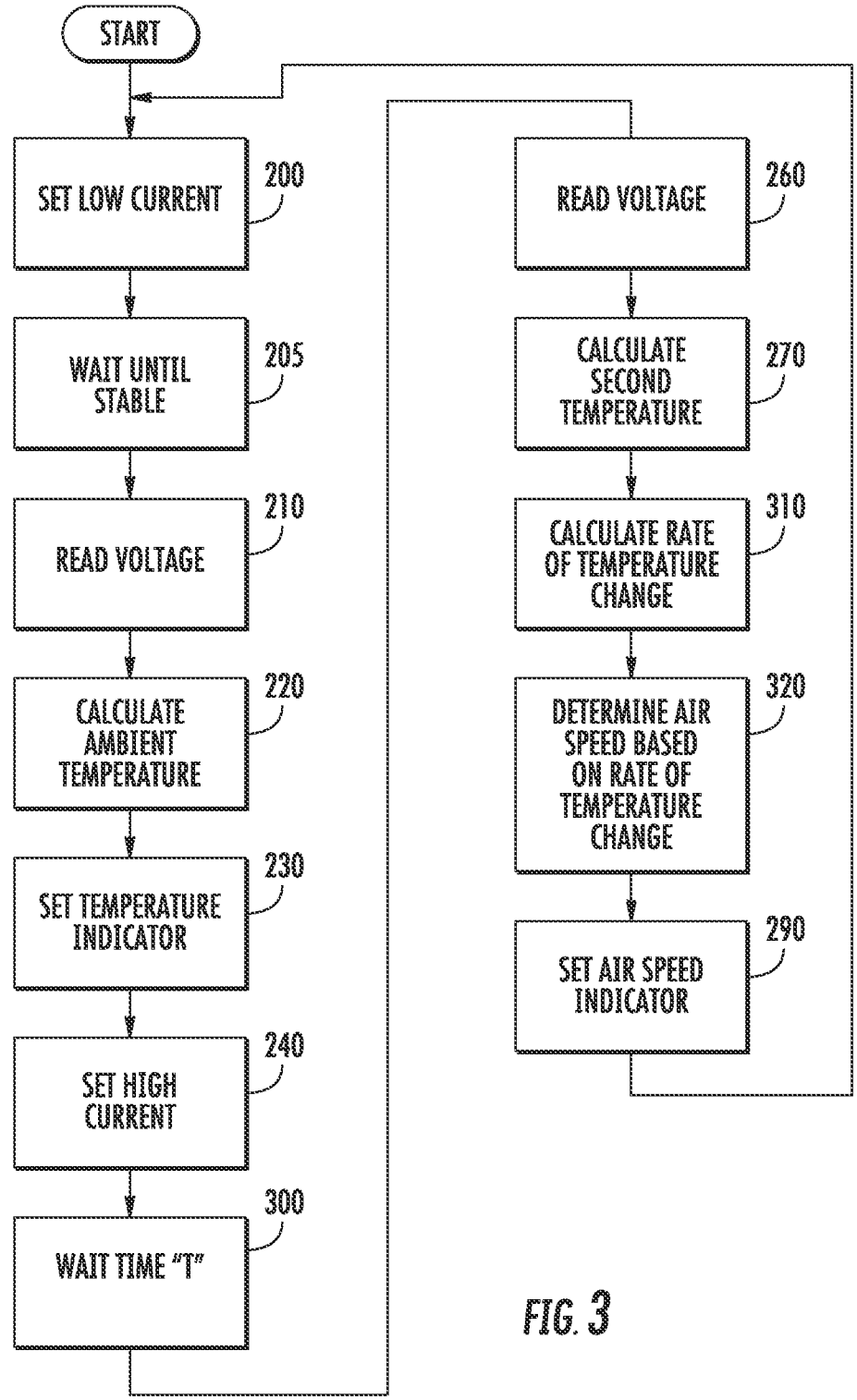
FIG. 3 is a representative flow chart showing the operation of a measurement system according to a second embodiment.

In another embodiment, shown in FIG. 3, the controller 110 uses the rate of temperature change, rather than the absolute temperature rise to determine airspeed. Most of the steps of FIG. 3 are the same as those in FIG. 2 and are not explained again. However, in this embodiment, the controller 110, after setting the high current, in Box 240, does not wait until the temperature is stable, as was done in FIG. 2. Rather, in this embodiment, the controller 110 waits a predetermined duration of time, T, as shown in Box 300, after changing the current to the thermistor 130, and then samples the output voltage, as shown in Box 260. This output voltage is then converted to a second temperature, as shown in Box 270. The difference between the ambient temperature and the second temperature is then divided by the wait time, T, to provide a rate of temperature change, as shown in Box 310. This rate of temperature change can be used to determine airspeed, as shown in Box 320. For example, similar to the method shown in FIG. 4, a table may be created which relates rate of temperature change to airspeed.

In another embodiment, rather then calculating rate of temperature change as shown in Box 310, the controller 110 may monitor the output voltage from the thermistor 130 a plurality of times, such as at fixed intervals. This allows the controller 110 to maintain a list of second temperatures as a function of time. This allows the rate of temperature change to be determined based on the plurality of second temperatures, based on the output voltage of the thermistor 130.

In either embodiment, the rate of temperature change may be used to determine airspeed. For example, a low rate of temperature change may suggest a large amount of air flow. Conversely, a greater rate of temperature change may suggest a lower amount of air flow.

Thus, in another embodiment, the temperature readings taken while the higher current is being applied to the thermistor 130, in conjunction with the duration of time between these readings may be used to calculate rate of temperature change, which can then be used to calculate airspeed. As described above, the controller 110 may use an equation or a table to calculate airspeed from rate of temperature change.

For example, a calibration procedure, such as that shown in FIG. 4, may be used to generate a plurality of data points correlating airspeed and rate of temperature change. This plurality of data points can be used to create a table, which can then be indexed into by the controller 110, such as during Box 320. Alternatively, this plurality of data points may be used to create a best fit line or other equation which relates observed rate of temperature change to airspeed.

In another embodiment, more than 2 current levels may be used. For example, 3 current levels may be used. The first, or lowest current level may be used to determine the ambient temperature as described above. After that, second current level, greater than the first current level, is used to determine the airspeed, as described above. If it is determined that there is airflow above a predetermined threshold, a third current level, greater than the second current level, may then be used. This third current level generates a greater amount of self-heating in the thermistor 130, thereby causing a greater temperature rise. This higher temperature rise may allow the controller 110 may make a more accurate determination of the airspeed. The use of three or more current levels may insure more reliable operation of the thermistor 130. For example, if there is no airflow, the application of the third current level may be deleterious to the thermistor 130, as the thermistor may overheat. The use of the second current level allows a determination to be made that there is at least some amount of airflow before applying a higher current level. Of course, more than 3 current levels may be used if desired.

Thus, the measurement system includes a thermistor 130, a current source 120 and a controller 110. The controller 110 includes a processing unit 111, in communication with a memory element 112 containing instructions, which when executed by the processing unit 111, enable the measurement system 100 to perform the sequences shown in FIGS. 2-3, thus allowing a single thermistor 130 to determine both ambient temperature and airspeed.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A measurement system, comprising:
a current source to supply an input current;
a thermistor to receive the input current and generate an output voltage that is a function of said input current and a temperature of said thermistor; and
a controller, comprising:
a processing unit in communication with a memory element, comprising instructions which, when executed by said processing unit:
control the current source to output a first input current to said thermistor so that said processing unit can determine an ambient temperature based on a first output voltage received from said thermistor; and
control the current source to output a second input current, higher than said first current, to said thermistor so that said processing unit can determine an indication of an airspeed about said thermistor based on a second output voltage received from said thermistor while said second input current is being applied to said thermistor,
wherein, to determine an indication of the airspeed, the processing unit:
waits a predetermined duration of time after said current source outputs said second current for said second temperature to be stable;
determines, after said predetermined duration of time, a second temperature of said thermistor based on said second output voltage while said second current is being applied;
calculates a temperature rise as a difference between said second temperature and said ambient temperature; and determines airspeed about said thermistor based on said temperature rise.

2. The measurement system of claim 1, wherein said first current raises a temperature of said thermistor by less than 0.5° C. in the absence of airflow about said thermistor.

3. The measurement system of claim 1, wherein said second current raises a temperature of said thermistor by at least 2° C. in the absence of airflow about said thermistor.

4. The measurement system of claim 1, wherein said memory element comprises a table relating temperature rise to airspeed.

5. The measurement system of claim 1, wherein said controller further provides an output signal representative of said ambient temperature.

6. The measurement system of claim 1, wherein said controller further comprises an output signal representative of said airspeed about said thermistor.

7. The measurement system of claim 6, wherein said output signal representative of said airspeed comprises an indication of whether said airspeed is above a predetermined threshold.

8. A measurement system, comprising:
a current source to supply an input current;
a thermistor to receive the input current and generate an output voltage that is a function of said input current and a temperature of said thermistor; and
a controller, comprising:
a processing unit in communication with a memory element, comprising instructions which, when executed by said processing unit:
control the current source to output a first input current to said thermistor so that said processing unit can determine an ambient temperature based on a first output voltage received from said thermistor; and
control the current source to output a second input current, higher than said first current, to said thermistor so that said processing unit can determine an indication of an airspeed about said thermistor based on a second output voltage received from said thermistor while said second input current is being applied to said thermistor,
wherein, to determine an indication of the airspeed, the processing unit:
waits a predetermined duration of time after said current source outputs said second current;
determines, after said predetermined duration of time, a second temperature based on said second output voltage while said second current is being applied;
calculates a rate of temperature change based on said predetermined duration of time, and a difference between said second temperature and said ambient temperature; and
determines an indication of the airspeed about said thermistor based on said rate of temperature change.

9. The measurement system of claim 8, wherein said memory element comprises a table relating rate of temperature change to airspeed.

10. The measurement system of claim 8, wherein said first current raises a temperature of said thermistor by less than 0.5° C. in the absence of airflow about said thermistor.

11. The measurement system of claim 8, wherein said second current raises a temperature of said thermistor by at least 2° C. in the absence of airflow about said thermistor.

12. The measurement system of claim 8, wherein said controller further provides an output signal representative of said ambient temperature.

13. The measurement system of claim 8, wherein said controller further comprises an output signal representative of said airspeed about said thermistor.

14. The measurement system of claim 13, wherein said output signal representative of said airspeed comprises an indication of whether said airspeed is above a predetermined threshold.

15. A measurement system, comprising:
a current source to supply an input current;
a thermistor to receive the input current and generate an output voltage that is a function of said input current and a temperature of said thermistor; and
a controller, comprising:
a processing unit in communication with a memory element, comprising instructions which, when executed by said processing unit:
control the current source to output a first input current to said thermistor so that said processing unit can determine an ambient temperature based on a first output voltage received from said thermistor; and
control the current source to output a second input current, higher than said first current, to said thermistor so that said processing unit can determine an indication of an airspeed about said thermistor based on a second output voltage received from said thermistor while said second input current is being applied to said thermistor,
wherein, to determine an indication of the airspeed, the processing unit:
monitors said second output voltage a plurality of times while said second current is applied to said thermistor;
calculates a rate of temperature change based on said plurality of second output voltages; and
determines airspeed about said thermistor based on said rate of temperature change.

16. The measurement system of claim 15, wherein said first current raises a temperature of said thermistor by less than 0.5° C. in the absence of airflow about said thermistor.

17. The measurement system of claim 15, wherein said second current raises a temperature of said thermistor by at least 2° C. in the absence of airflow about said thermistor.

18. The measurement system of claim 15, wherein said controller further provides an output signal representative of said ambient temperature.

19. The measurement system of claim 15, wherein said controller further comprises an output signal representative of said airspeed about said thermistor.

20. The measurement system of claim 19, wherein said output signal representative of said airspeed comprises an indication of whether said airspeed is above a predetermined threshold.

* * * * *